United States Patent

De Jean et al.

[15] 3,651,467

[45] Mar. 21, 1972

[54] ELECTRONIC MULTISELECTOR HAVING LARGE AND SMALL GEOMETRY MOS TRANSISTOR CROSSPOINT CONTROL

[72] Inventors: Jacques Henri De Jean, Ris-Orangis; Marc Jean Pierre Leger, Chaville; Claude Paul Henri Lerouge, Maurepas, all of France

[73] Assignee: International Standard Electric Corporation, New York, N.Y.

[22] Filed: Dec. 3, 1970

[21] Appl. No.: 94,839

[30] Foreign Application Priority Data

Sept. 19, 1969 France ..................................6944164

[52] U.S. Cl. ..............................................340/166, 340/147

[51] Int. Cl. ..........................................................H04q 3/00

[58] Field of Search ..................................................340/166

[56] References Cited

UNITED STATES PATENTS 3,550,088 12/1970 Jones ....................................340/167

*Primary Examiner*—Harold I. Pitts
*Attorney*—C. Cornell Remsen, Jr., Walter J. Baum, Paul W. Hemminger, Charles L. Johnson, Jr., James B. Raden, Delbert P. Warner and Marvin M. Chaban

[57] ABSTRACT

A memory unit is provided at each crosspoint of an electronic multiselector. The memory comprises a bistable element and a capacitor which keeps the crosspoint latched while external determinations are made concerning future changes of state of the crosspoint.

3 Claims, 6 Drawing Figures

Inventor
J. H. DEJEAN - M.J.P. LEGER -
C.P.H. LEROUGE
By O. G. Warner
Attorney

ELECTRONIC MULTISELECTOR HAVING LARGE AND SMALL GEOMETRY MOS TRANSISTOR CROSSPOINT CONTROL

The present invention concerns improvements to multiselectors for switching stages in which the contacts located at the cross-points are replaced by field effect transistors and in which the holding of said contacts in closed position is carried out in an electronic way.

It is known that field effect transistors and more particularly insulated gate transistors, known as "MOS transistors," present interesting characteristics when they are used as contact elements. In fact, the drain-source resistance of a MOS transistor which constitutes the switch contact is controlled by the grid voltage with no grid-source current providing an excellent insulation of the control circuit with respect to the controlled circuit. Besides, in a transistor of this type, the drain-source resistance is higher than $10^7$ ohms while blocked and it ranges between 100 to 300 ohms in the low impedance conducting state thus assuring, with some precautions, a good operation as a switching element.

Another advantage presented by a multiselector using MOS transistors as contact elements is the fact that the selection and the control circuits may also be designed with MOS transistors, for the active elements as well as for the resistors. It results therefrom that one may design elementary multiselectors of a capacity of 4×2, 4×4, 4×8 etc., cross-points in the form of monolithic integrated circuits which, as it is well known, may comprise several hundreds of MOS transistors.

In the second certificate of addition (No. 94,440) to the main patent, one has described an elementary multiselector with matrix arrangement comprising $m$ vertical and $n$ horizontals. At each cross-point between a vertical $j$ and a horizontal $k$ one has located a switching circuit X$jk$ with MOS transistors comprising switching elements (each element enables to establish a connection between a vertical and a horizontal) and a flip-flop assuring the holding of the said elements in the closed or open position. Two shift registers comprising $m$ and $n$ stages are associated, respectively, to the verticals and to the horizontals and, for preparing the closing or the opening of the switching circuit X$jk$, one sets to the 1 state the flip-flop of rank $j$ of the first register and the flip-flop of rank $k$ of the second register. The effective command is performed afterwards by applying a signal over one of the two conductors assigned respectively to the opening control and to the closing control.

It is thus seen that, in a multiselector of this type, one uses $m\times n$ holding flip-flops and $m\times n$ stages of shift registers.

In the present invention, the MOS transistors switching circuit comprises only the contact elements and a control transistor and the selection function is carried out by means of a single shift register comprising $m\times n$ stages. Each stage is associated to a switching circuit and its state, 1 or 0, controls the closing and the opening of this circuit and its holding in this position. The register assures then the holding under normal operation, i.e., when no modification at all must be brought to the state of the switching circuits of the multiselector.

When the state of one of these circuits must be modified, the content of the register is transferred to a marker circuit and is processed before being reintroduced in the said register. The holding of the state of the cross-points is assured, during this modification phase, by the charge stored in the grid-substrate capacity of the contact elements. It will be noted that the value of this capacity is relatively high since the dimensions of said elements are made important in order to obtain low contact resistances (drain-source resistances of a conductive transistor).

This organization of the elementary multiselectors presents the advantage of minimizing the number of terminals of the monolithic integrated circuit.

The object of the present invention is thus an elementary electronic multiselector with built-in holding capacity and having a minimum number of terminals.

According to one characteristic of the invention, the circuits associated to each cross-point between two perpendicular speech conductors comprise means for setting up electrical connections between said conductors, said means being constituted by a large-geometry MOS transistor Q, means for controlling and holding this connection by means of a small-geometry MOS transistor Q1 one of the output electrodes of which (drain or source) is connected to the grid of the first MOS transistor, the association of the transistors Q and Q1 constituting a switching circuit X, means for supplying the information which holds the transistor Q in the blocked or in the conductive state comprising a holding flip-flop W having its 1 output connected to the source of the transistor Q1 so that, when said transistor is conducting and that its electrodes are brought to different potentials, the voltage characterizing the state of the flip-flop W is applied to the grid of the transistor Q.

According to another characteristic of the invention, there are provided means for realizing an elementary multiselector by grouping $m\times n$ switching circuits in a matrix arrangement, means for connecting the grids of all the transistors Q1 to the same conductor e, means for grouping the $m\times n$ holding flip-flops W in a MOS transistor static shift register so that this latter constitutes the image network of the multiselector status, means for transferring the contents of the register to a marker circuit when the state of a switching circuit must be modified, the grid-substrate capacity of the transistor Q holding the state of said switching circuits and means for rewriting the new information in the register, these transfer operations occuring when a blocking signal of the transistors Q1 is applied to the conductor E.

The above mentioned and other features and objects of this invention will become apparent by reference to the following description taken in conjunction with the accompanying drawings in which.

Figure 5:
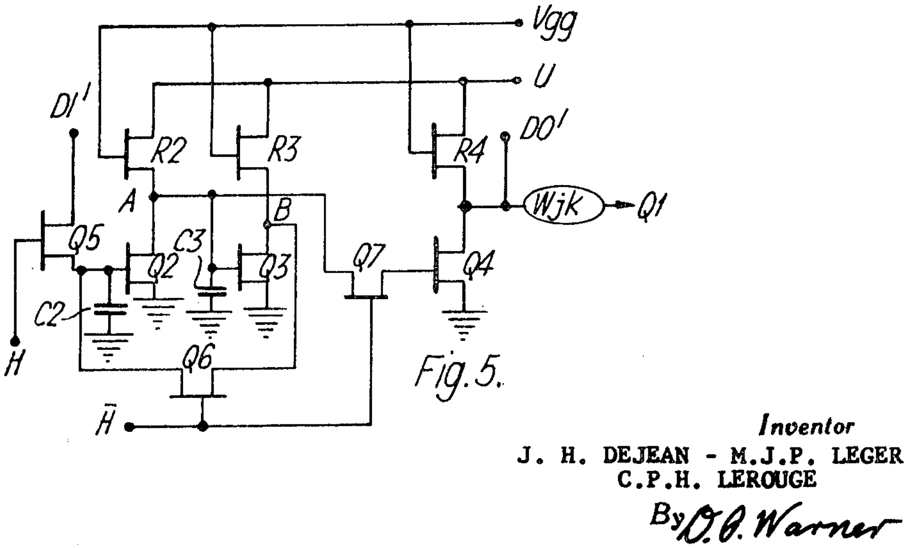

FIGS. 4$a$ and 4$b$ represent the diagrams of the clock signals;

FIG. 5 represents the diagram of a stage of a static shift register.

Before describing the invention, the main characteristics of the MOS transistors and their way of operation will be described.

A MOS transistor is almost perfectly symmetrical and the electrodes which play the role of drain and of source may be inverted without any inconvenience and without modification of operation when it is used in a logical circuit.

In the operation of a MOS-Ph transistor (P-channel enhancement transistor) the following voltages are defined:

VT: threshold voltage,

VD: drain voltage,

VG: grid voltage.

The voltages VD and VG are measured with respect to the source voltage ($VS$=0) and are negative. The threshold VT, which is an intrinsic parameter of the transistor, is negative for a MOS-Ph transistor.

A transistor of this type is blocked for VG≥VT. It presents then a drain-source resistance RDS of a practically infinite value (about $10^7$ ohms).

A MOS-Ph transistor is conducting when VG<VT (the sign "<" is read "more negative than"). It behaves then as a passive resistor of value $RDS=\frac{1}{K|VG-VT|}$ (1) $K$ being a factor of proportionality.

Distinction is made in this case between two conduction regions:

The low impedance conduction region (or non-saturated region) when $0>VD>VG-VT$, where the drain-source resistance $RDS$ presents a low value (50 to 400 ohms). It will be said afterwards that a transistor operating in this region is in its "low-impedance on" state.

The high impedance conduction region (or saturated region) when $VD<VG-VT<0$ with a $RDS$ resistance having a relatively high value.

If a MOS-Ph transistor presents a threshold voltage $VT=-4$ v. and if a voltage $VG=0$ is applied to it, it is blocked. If one applies to it a voltage $VG=-24$ v. and a voltage $VD$ comprised between 0 and −20 volts, it sets in the state which has just been defined as the low impedance-on region. Practically, if it is desired to have a good linearity of the resistance $RDS$, one must be limited to low values of $VD$.

The resistance $RDS$ presents then a very low value and it enables the bidirectional transfer of analog or digital signals between the drain and the source.

The MOS transistors are also used as resistors thus enabling to implement monolithic integrated circuits. This operation as passive elements may be obtained for one of the other of the conduction types. For instance, if a transistor is set in the low-impedance on state by a suitable bias voltage applied permanently ($VD>VG-VT$) and if it is connected in series with an inverted transistor, it appears over the connection which is common to both transistors, the voltage $VD$ or a voltage $VM$ slightly negative according to whether said inverter is blocked ($VG \gtrsim VT$) or conducting ($VG<VT$). In this last case, if $VM>VT$, one may control another MOS transistor without any difficulty and it will be said afterwards, in order to simplify the description, that $VM=0$.

In the various Figures of the description, the MOS transistors used as active elements carry the reference "Q" and those use as load resistors carry the reference "R". It is obvious that the utilization of MOS transistors as load resistors can only be considered in integrated technology in which case it presents advantages from the point of view of manufacturing. However, it is well understood that each MOS transistor which carries the reference R and which is used as a resistor can be replaced by a conventional resistor of equivalent value.

Figures 1, 2, 4A, 4B:
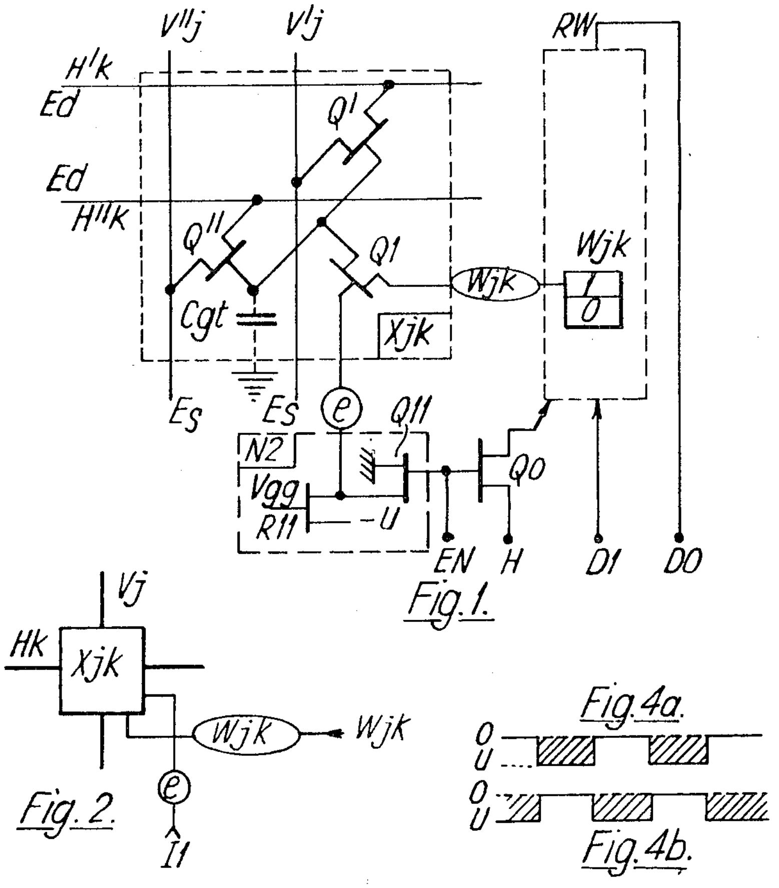
FIG. 1 represents the circuits associated to a cross-point.
FIG. 2 represents the symbol characterizing a switching circuit.

The voltages applied to the circuits represented on the Figures 1, 4.*a*, 4.*b*, 5 are defined in the table hereafter.

| Reference | Value (volts) | Definition |
|---|---|---|
| VT | −4 | Threshold voltage of the MOS transistors. |
| U | −20 | "High" level of the voltages applied to the transistors and of the logical signals (EN, H, H, DI, DO etc. . . .). |
| VM | ≃0 | "Low" level of the voltages applied to the transistors and of the logical signals. |
| Vgg | −28 | Grid bias of the MOS connected as resistors (R2, R3, R4, Figure 5 and R11 Figure 1). |
| Eds | ≃\|1,5\| | Potential difference between conductors H'k (H"k) and V'j (V"j). |
| Ed, Es | 0>Es>−10 | Voltages applied to the horizontal and to the verticals. |

N.B.: "<" means "more negative than."

FIG. 1 represents the circuits associated to a cross-point constituted by the intersection of the horizontals H'*k*, H"*k* and verticals V'*j* and V"*j* brought respectively to the potentials Ed and Es (refer to the table). Each one of the couples of the conductors H'*k*, V'*j*, and H"*k*, V"*j* assures the transmission of the information in one direction as it has been described in the main U.S. Pat. No. 1,555,813.

The circuits represented on this figure comprise:

The switching circuit X*jk* comprising the MOS-Ph transistors Q' and Q" which assure the connection between the couples of conductors and the control transistor Q1 which is of the same type;

The holding flip-flop W*jk* which supplies on its 1 output a high level signal or a low level signal according to whether it is in the 1 state or in the 0 state.

The output of this flip-flop is connected to the transistor Q1 by the conductor *wjk*.

The inverter N2 comprising the transistors Q11 and R11 and which supplies, over the conductor *e*, a low or high level signal controlling Q1.

The transistor Q0 the role of which is explained afterwards.

All these circuits are designed for being implemented in monolithic integrated circuit with a common substrate brought to ground potential.

In the circuit W*jk*, the transistors Q' and Q" have relatively high dimensions in order to present a low resistance R*ds* in the low-impedance on state so that the grid-substrate capacity C*gt* presents a rather high value. It results therefrom that, if the control transistor Q1 is blocked during a certain time, the capacity C*gt* holds the grid voltage which was applied to Q' and Q" before this blocking. Besides, it is known that the drain-source circuit of a MOS transistor is equivalent to two diodes connected in series and in opposition and which are both blocked, their common point being constituted by the substrate. But, the transistor Q1 has small geometry (with a relatively high drain-source resistance so that the reverse current of the drain-substrate diode is extremely low and that the capacity C*gt* does not discharge practically during the blocking of Q1, if it is charged at a potential U.

One will not describe the operation of the switching circuit X*jk* according to the state of the transistor Q1. When the conductor *e* is grounded the transistor Q1, the drain and the source of which are at equal or more negative potentials (zero and U) than the grid, is blocked and the grid voltage of Q' and Q" is maintained by the charge stored in the capacity C*gt*.

When the conductor *e* is brought to the potential U, one may consider two cases by calling "output electrodes" the drain and the source of the transistor Q1:

1. The output electrodes are at the same potential, these potentials being fixed by the charge of C*gt* and the state of the flip-flop W*jk*: no current at all flows in Q1 whether it is conducting or blocked.
2. The output electrodes are at different potentials, zero and U: the transistor is then conducting with a drain current different from zero, the grounded electrode acting a drain. The capacity C*gt* is then charged at the voltage which is present over the conductor *wjk*. If the flip-flop W*jk* is in the 1 state, Q' and Q" are conducting and the information is transmitted between V'*j*, H'*k* and V"*j*, H"*k*. If it is in the 0 state, these transistors are blocked and the connection between the couples of conductors is cut out.

The switching circuit W*jk* is represented in a symbolic way on FIG. 2. On this Figure the conductors V'*j*, V"*j* (H'*k*, H"*k*) have been grouped in a single conductor V*j* (*Hk*) and one has shown the control conductors *e* and *wjk* defined hereabove.

Figure 3:
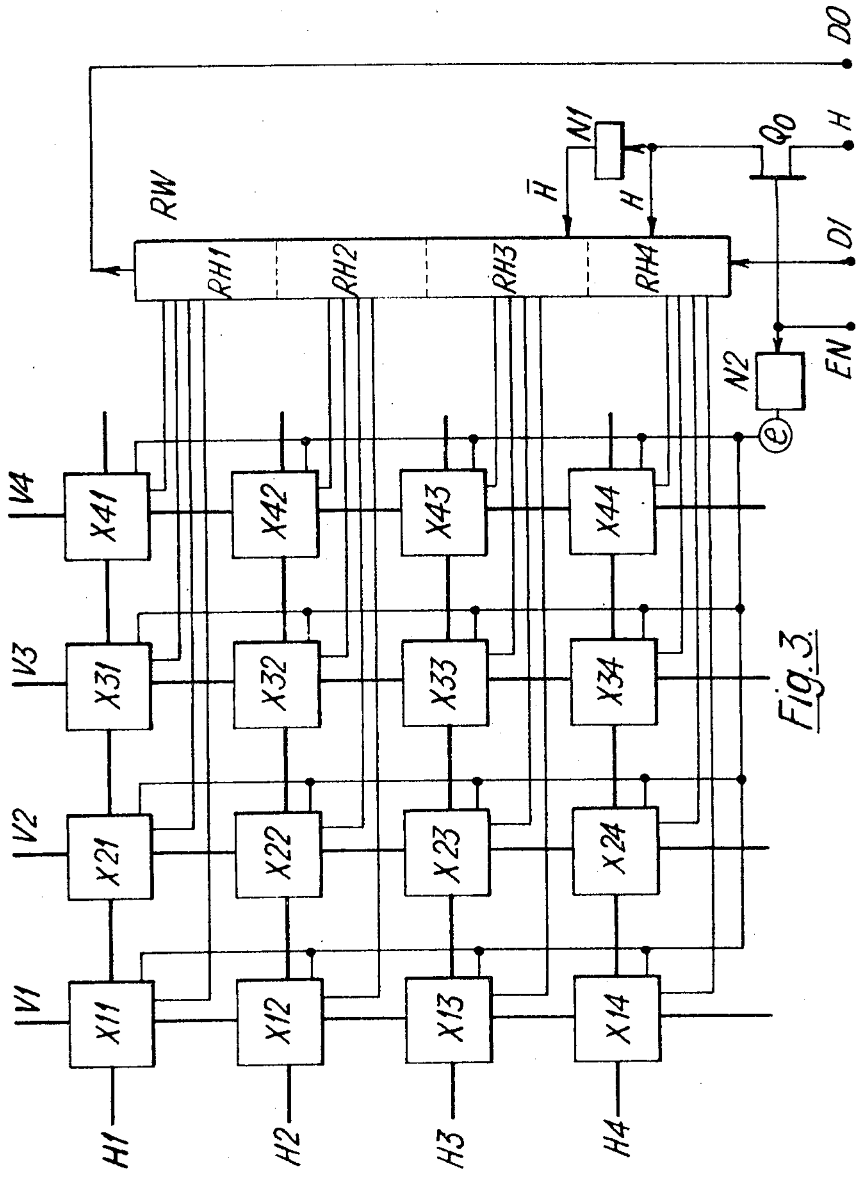
FIG. 3 represents an elementary multiselector.

FIG. 3 represents an elementary multiselector comprising, by way of a non limitative example, sixteen switching circuits XII, X21... X41, X12, X22 etc... The holding flip-flops (such as W*jk*, FIG. 1) of these circuits are grouped in the shift register RW which may be divided into four sections RH1, RH2, RH3, RH4 assigned respectively to the control of the circuits associated to the horizontals H1, H2, H3, H4. This register RW is a MOS static shift register which receives advance signals H and $\overline{H}$ and to which the information signals are applied over the terminal DI.

The signals H, represented on the FIG. 4.*a*, are supplied by a clock and the inverter N1 supplies the complementary signals $\overline{H}$ (FIG. 4.*b*).

In normal operation, the input EN of the multiselector is grounded so that the MOS transistor Q0 is blocked and that the register RW does not receive any advance signals. Besides, this signal EN is inverted by the circuit N2 so that the conductor *e*, which is common to all the switching circuits, is brought to the potential U and that all the transistors Q1 are conducting bringing the grids of Q' and Q" to the potential of the 1 output of the corresponding holding flip-flop. In each one of the sections RH1 to RH4, one stage at most may be in the 1 state (flip-flop W*jk* of FIG. 1) assuring the holding of the corresponding switching circuit in closed position. All of the other circuits are open.

When a modification of the state of one switching circuit must be carried out, the input EN of the multiselector is brought to the potential U so that the transistor Q0 is conducting and all the transistors Q1 of the multiselector are blocked. As it has been seen hereabove, the capacity *Cgt* (FIG. 1) holds the grids of Q' and Q'' at the potential which was applied to them before the blocking. The state of the switching circuits is then maintained and the register RW receives the advance signals H and $\overline{H}$. Its content is then transmitted to the marker over the outlet DO. When the data processing in this circuit is over, the new data is reintroduced in the register RW through the input DI and the input EN is grounded again. It is thus seen that the input EN is brought at the potential U during the duration of the modification.

FIG. 5 represents the detailed diagram, given by way of example, of a stage Sp of the register RW designed with transistors MOS-Ph.

It comprises the inverters Q2–R2, Q3–R3, Q4–R4 and the transistors Q5 (controlled by the signals H), Q6 and Q7 (controlled by the signals $\overline{H}$). This stage comprises an input terminal DI' and an output terminal DO' and the logical 1 (0) state of such a stage is characterized by the presence of a potential U (zero) over the output terminal DO'. The grid-substrate capacities C2 and C3 of the transistors Q2 and Q3 are symbolized by the capacitors C2 and C3. One will assume that initially, C2 is discharged and that the grid of Q2 is grounded.

When the preceding stage S(*p*–1) is in the 1 state and that a signal H appears, the transistor Q5 is conducting. A voltage U is then applied to the grid Q2 which becomes conducting and the point A is grounded thus blocking Q3. The point B is than at the potential U. At the end of the signal H, the grid-substrate capacities C2 and C3 of Q2 and Q3 hold the grid voltages until the time of occurrence of the signal $\overline{H}$ which unblocks Q6 so that the potential U of the point B is applied to the grid of Q2 thus initiating a locking of the stage in the state where it has been put by the signal H. This signal $\overline{H}$ controls also the setting into the conducting state of Q7 which transmits the potential of the point A (ground potential) to the grid of Q4 which is blocked so that, during the presence of this signal $\overline{H}$, the terminal DO' and the conductor *wjk* (see FIG. 1) are brought to the potential u: the 1 state of the stage S(p–1) is then transferred to the output of the stage S*p* in one cycle of clock signals. One understands then that the 0 state of the stage S(p–1) is transferred in a similar way into the stage S*p* if C2 is charged at the potential U.

We claim:

1. An electronic switching circuit for establishing electrical connections at the cross-points between vertical and horizontal conductors comprising output electrodes including the source and the drain electrodes of a large-geometry MOS transistor, means coupling the source electrodes to the vertical conductors and the drain electrodes to the horizontal conductors, an electrical connection being established when the transistor is conducting and cut off when it is blocked, means coupling the grid of the transistor to an output electrode of a small-geometry MOS transistor the grid of which as well as another output electrode of which are connected respectively to first and second control conductors, means connecting the second conductor to the 1 output of a holding flip-flop so that, when a voltage which makes the small-geometry transistor conducting is applied to the first conductor and the output electrodes of said transistor are at different potentials, this latter transmits the state of the flip-flop to the large-geometry transistor, said transistor being conducting when the flip-flop is in the 1 state and if, when a voltage which blocks the large-geometry transistor is applied to the first conductor, the grid potential of the large-geometry transistor is held in its grid-substrate capacity so that this transistor remains in its previous state.

2. An elementary multiselector in a matrix arrangement comprising *m* verticals and *n* horizontals arranged as a switching circuit in accordance with claim 1, in which the grids of all the small-geometry transistors are connected to the same first conductor, $m \times n$ holding flip-flops are grouped in an MOS static shift register so that this latter constitutes the image network of the state of the multiselector, that in normal operation the first conductor is brought to the potential which makes conductive all the control transistors, that, when the state of a cross-point of the multiselector must be modified by modifying the state of the associated holding flip-flop, the content of the register is transferred to a marker circuit in which the modification is performed, that the new data is written in the register RW and that, during all the time of transfer and of data processing, the first conductor is brought to a potential which blocks all the control transistors of the multiselector.

3. A switching circuit according to claim 1 in which each vertical and each horizontal comprises *p* conductors, each one of the *p* couples of conductors is associated to a large-geometry MOS transistor Q', Q'', etc... and that the grids of all these transistors are connected to one of the output electrodes of one single control transistor.

* * * * *